United States Patent
Kupitman et al.

(10) Patent No.: US 10,860,462 B2
(45) Date of Patent: Dec. 8, 2020

(54) SYSTEM, COMPUTER PROGRAM PRODUCT AND METHOD FOR ENHANCED PRODUCTION ENVIRONMENT BEHAVIOR MIRRORING E.G. WHILE CONDUCTING PILOT ON PROOF-OF-CONCEPT (POC) PLATFORMS

(71) Applicant: Proov Systems Ltd, Herzliya (IL)

(72) Inventors: Yury Kupitman, Ganei Tiqwa (IL); Alexey Sapozhnikov, Ramat Gan (IL); Toby Olshanetsky, Herzliya (IL); Israel Ben Tal, Petah Tikva (IL)

(73) Assignee: PROOV SYSTEMS LTD., Herzliya (IL)

( * ) Notice: Subject to any disclaimer, the term of this patent is extended or adjusted under 35 U.S.C. 154(b) by 0 days.

(21) Appl. No.: 16/405,006

(22) Filed: May 7, 2019

(65) Prior Publication Data

US 2019/0340101 A1  Nov. 7, 2019

Related U.S. Application Data

(60) Provisional application No. 62/667,631, filed on May 7, 2018, provisional application No. 62/667,630, filed on May 7, 2018.

(51) Int. Cl.
  *G06F 11/36* (2006.01)
  *G06F 11/34* (2006.01)
  (Continued)

(52) U.S. Cl.
  CPC ............ *G06F 11/3664* (2013.01); *G06F 8/20* (2013.01); *G06F 11/3457* (2013.01);
  (Continued)

(58) Field of Classification Search
  CPC .. G06F 2201/865; G06F 8/20; G06F 11/3457; G06F 11/3006; G06N 20/00
  (Continued)

(56) References Cited

U.S. PATENT DOCUMENTS

| 5,644,694 A | 7/1997 | Appleton |
| 5,729,669 A | 3/1998 | Appleton |

(Continued)

FOREIGN PATENT DOCUMENTS

WO  2008/134453 A1  11/2008

OTHER PUBLICATIONS

"Application Layer Intrustion Dectection", available online at https://www.owasp.org/index.php/ApplicationLayerIntrustionDetection, downloaded Sep. 7, 2015.
(Continued)

*Primary Examiner* — John Q Chavis
(74) *Attorney, Agent, or Firm* — Browdy and Neimark, PLLC

(57) ABSTRACT

A method for running proof-of-concepts for software solutions, including receiving, from an enterprise, an indication of network locations of servers in a production environment for a software solution selected from among plural candidates software solutions participating in a proof-of-concept running in a proof-of-concept (aka PoC) environment on a PoC platform; providing at least one recording, uploaded onto the platform, of traffic between the servers in the production environment; providing a mapping of the network locations to, respectively, PoC platform local network addresses of servers within the PoC environment; adapting the recording by replacing each occurrence of an individual one of the network locations, within the recording, with a PoC environment server local network PoC platform address to which the individual one was mapped, thereby to generate
(Continued)

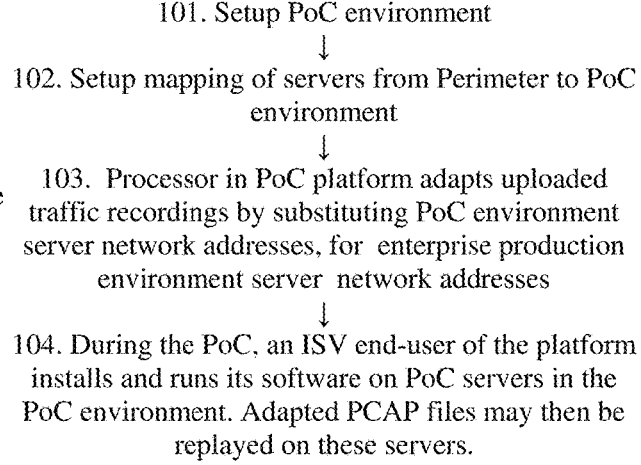

1. Perimeter definition
↓
2. generating (PCAP file e.g.) recordings on the servers in perimeter
↓
3. Uploading the recorded (e.g. PCAP) file to the PoC platform 101. Setup PoC environment
↓
102. Setup mapping of servers from Perimeter to PoC environment
↓
103. Processor in PoC platform adapts uploaded traffic recordings by substituting PoC environment server network addresses, for enterprise production environment server network addresses
↓
104. During the PoC, an ISV end-user of the platform installs and runs its software on PoC servers in the PoC environment. Adapted PCAP files may then be replayed on these servers.

at least one adapted file; and replaying the at least one adapted file on the servers within the PoC environment.

13 Claims, 1 Drawing Sheet

(51) Int. Cl.
    *G06F 8/20*     (2018.01)
    *H04L 12/26*     (2006.01)
    *G06N 20/00*     (2019.01)

(52) U.S. Cl.
    CPC ...... *G06F 11/3608* (2013.01); *G06F 11/3668* (2013.01); *G06N 20/00* (2019.01); *H04L 43/50* (2013.01)

(58) Field of Classification Search
    USPC .......................................................... 717/124
    See application file for complete search history.

(56) References Cited

U.S. PATENT DOCUMENTS

| | | | |
|---|---|---|---|
| 7,509,626 | B1 | 3/2009 | Barnes et al. |
| 7,620,933 | B1 | 11/2009 | Appleton |
| 8,694,953 | B2 | 4/2014 | Khodabandehloo et al. |
| 9,329,915 | B1 | 5/2016 | Chandrasekharapuram et al. |
| 10,140,206 | B2 | 11/2018 | Sapozhnikov et al. |
| 10,348,578 | B2 | 7/2019 | Sapozhnikov et al. |
| 2004/0111428 | A1 | 6/2004 | Rajan et al. |
| 2010/0274800 | A1* | 10/2010 | Bogeby .................. H04L 67/28 707/769 |
| 2013/0288736 | A1* | 10/2013 | Laumen ................ H04W 84/08 455/518 |
| 2014/0365198 | A1 | 12/2014 | Kuell et al. |
| 2017/0139816 | A1* | 5/2017 | Sapozhnikov ............ G06F 8/60 |
| 2018/0053134 | A1* | 2/2018 | Olshanetsky ............ G06F 8/60 |
| 2019/0050321 | A1 | 2/2019 | Sapozhnikov et al. |
| 2019/0114251 | A1 | 4/2019 | Sapozhnikov et al. |

OTHER PUBLICATIONS

"Apache Commons Math" available online at http://commons.apache.org/proper/commons-math/userguide/stat.html, downloaded Oct. 29, 2015.
"Apache Drill", available online at https://drill.apache.org/, downloaded Oct. 23, 2015.
"Sparkling Water provides H2) funcitionality inside Spark cluster" available online at https://github.com/h2oai/sparkling-water.git, downloaded Aug. 10, 2015.
"Apache Flink", available online at https://en.wikipedia.org/w/index.php?title=Apache_Flink&oldid=685853621, Oct. 15, 2015.
"MapReduce", available online at https://en.wikipedia.org/w/index.php?title=MapReduce&oldid=687813284, Oct. 25, 2015.
PCAP definition on Wikipedia (Mar. 2018): available online at https://en.wikipedia.org/w/index.php?title=Pcap&oldid=830802604.
What is PCAP? (Apr. 2018): available online at https://web.archive.org/web/20180415041237/http://www.tech-faq.com/pcap.html.
How to Monitor Machine Learning Models in Real-Time (Jan. 2019): available online at https://www.kdnuggets.com/2019/01/monitor-machine-learning-real-time.htML.
6 Supervised machine learning models on the given dataset (Oct. 2017): available online at https://www.kaggle.com/nirajvermafcb/comparing-various-ml-models-roc-curve-comparison.
Metrics to Evaluate Machine Learning Algorithms in Python (Aug. 2018): available online at https://web.archive.org/web/20180826095232/https://machinelearningmastery.com/metrics-evaluate-machine-learning-algorithms-python/.
Methods for saving and loading Keras Deep Learning Models (Jul. 2017): available online at https://web.archive.org/web/20170711040859/https://machinelearningmastery.com/save-load-keras-deep-learning-models/.
Training, validation, and test sets definition on Wikipedia (Dec. 2018): available online at https://en.wikipedia.org/w/index.php?title=Training,_validation,_and_test_sets&oldid=875589895.
Choosing the right estimator (Dec. 2018): available online at https://web.archive.org/web/20181231235826/https://scikit-learn.org/stable/tutorial/machine_learning_map/index.html.
Examples to available datasets websites: Data catalog (Apr. 2018): available online at https://web.archive.org/web/20180428055928/https://catalog.data.gov/dataset.
NYC open data (Jul. 2018): available online at https://web.archive.org/web/20180730220430/https://opendata.cityofnewyork.us/data/.
Kaggle datasets (Jul. 2018): available online at https://web.archive.org/web/20180730023626/http://www.kaggle.com/datasets.
A part of an example Python code snippet, operative to measure ROC AUC (Nov. 2018): available online at https://web.archive.org/web/20181130112834/https://raw.githubusercontent.com/jbrownlee/Datasets/master/pima-indians-diabetes.data.csv.
Song, Y., Zhang, L., & Giles, C. L. (2011). Automatic tag recommendation algorithms for social recommender systems. ACM Transactions on the Web (TWEB), 5(1), 4.
"N-gram", available online at https://en.wikipedia.org/wiki/N-gram, Mar. 1, 2020.
"Beginners guide to text generation using LSTMs" available online at https://www.kaggle.com/shivamb/beginners-guide-to-text-generation-using-lstms, 2019.
Available online at https://cs.stanford.edu/~zxie/textgen.pdf, Mar. 22, 2018: Xie, Z. (2017). Neural text generation: A practical guide. arXiv preprint arXiv:1711.09534.
Available online at https://www.ijstr.org/final-print/mar2017/A-Review-Of-Synthetic-Data-Generation-Methods-For-Privacy-Preserving-Data-Publishing.pdf.\—Mar. 3, 2017: Surendra, H., & Mohan, H. S. (2017). A review of synthetic data generation methods for privacy preserving data publishing. Int J Sci Technol Res, 6(3), 95-101.
Available online at https://www.aclweb.org/anthology/P18-1194/, Jul. 2018: Luo, B., Feng, Y., Wang, Z., Huang, S., Yan, R., & Zhao, D. (2018). Marrying up regular expressions with neural networks: A case study for spoken language understanding. arXiv preprint arXiv:1805.05588.
"Bag of Words", available online at https://en.wikipedia.org/wiki/Bag-of-words_model, Feb. 26, 2020.
"Apache POI", available online at https://poi.apache.org/, Feb. 2020.
"Analyzing Sentence Structure", available online at https://www.nltk.org/book/ch08.html, Sep. 4, 2019.
"KDnuggets", available online at https://www.kdnuggets.com/2015/01/text-analysis-101-document-classification.html, Jan. 2015.
"Proov", available online at https://proov.io, downloaded on Aug. 6, 2020.

* cited by examiner

FIG. 1

1. Perimeter definition
   ↓
2. generating (PCAP file e.g.) recordings on the servers in perimeter
   ↓
3. Uploading the recorded (e.g. PCAP) file to the PoC platform

FIG. 2

101. Setup PoC environment
   ↓
102. Setup mapping of servers from Perimeter to PoC environment
   ↓
103. Processor in PoC platform adapts uploaded traffic recordings by substituting PoC environment server network addresses, for enterprise production environment server network addresses
   ↓
104. During the PoC, an ISV end-user of the platform installs and runs its software on PoC servers in the PoC environment. Adapted PCAP files may then be replayed on these servers.

SYSTEM, COMPUTER PROGRAM PRODUCT AND METHOD FOR ENHANCED PRODUCTION ENVIRONMENT BEHAVIOR MIRRORING E.G. WHILE CONDUCTING PILOT ON PROOF-OF-CONCEPT (POC) PLATFORMS

REFERENCE TO CO-PENDING APPLICATIONS

Priority is claimed from U.S. provisional application No. 62/667,631, entitled " . . . Enhanced Production Environment Behavior Mirroring E.G. while Conducting Pilot On Proof-Of-Concept Platform", and from U.S. provisional application No. 62/667,630 entitled "PoC Platform Which Compares Startup Models", both filed 7 May 2018, the disclosures of which applications are hereby incorporated herein by reference.

FIELD OF THIS DISCLOSURE

The present invention relates generally to software and more particularly to proof-of-concept (PoC) i.e. pilot testing, of software.

BACKGROUND FOR THIS DISCLOSURE

Conventional PoC platforms are described e.g. in the following publications:

U.S. Ser. No. 15/347,191 filed Sep. 11, 2016, publication number US 2017/0139816, describes a computerized method and end-to-end "Pilot as a Service" system for controlling start-up/enterprise interactions" including an end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered.

U.S. Ser. No. 15/586,575 filed Apr. 5, 2017, publication number US-2018-0053134 describes a "System, method and computer product for management of proof-of-concept software pilots, including neural network-based KPI prediction" including a computerized computer software pilot evaluation method for quantifying performance of a first population of start-up end-users, each start-up end-user contending within at least one software pilot defined by, including performing a software task for, an enterprise end-user from among a second population of enterprise end-users, the method comprising: generating at least one neural network model, using a processor, for at least one startup server participating in at least one enterprise's pilot (aka computer software pilot), the computer software pilot comprising a task to be performed by each of at least one startup server participating in the pilot, and using the at least one neural network model to predict at least one derivable KPI from measurable KPIs generated by the startup server within the enterprise's pilot.

A software proof-of-concept platform, including simulation of product behavior and/or data is described in US Patent Publication 20190114251, including a system comprising a platform configured for communicating with enterprise end-users and for allowing the enterprise end-users to perform proof-of-concept testing for startups which provide respective enterprises with software products to be evaluated by the respective enterprises, the platform including processor functionality configured to analyze available information on enterprise data and, accordingly, generate metadata characterizing the enterprise data; generate artificial enterprise data conforming to the metadata; analyze available information on enterprise APIs and, accordingly, generate metadata characterizing the enterprise APIs; and generate at least one artificial API conforming to that metadata.

A computerized method and end-to-end "Pilot as a Service" system for controlling start-up/enterprise interactions is described in US patent Publication number: 20190050321, including an end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered.

A computerized method and end-to-end "pilot as a service" system for controlling start-up/enterprise interactions is described in U.S. publication patent Ser. No. 10/140,206 including an end-to-end "pilot as service" system for software pilot testing, comprising a server including at least one processor and operative for generating a set of software testing environment/s simultaneously serving plural clients from among a first plurality of enterprise clients, the environment being operative for concurrently running plural proof-of-concept tests for respective plural software products each being tested ("pilots"), on behalf of an individual start-up client from among a second plurality of start-up clients, by an individual one of the population of enterprise clients; a registration functionality, on the processor, operative for pre-registering at least one of: enterprise clients from among the first plurality of enterprise clients, and start-up clients from among the second plurality of start-up clients; and a dashboard functionality, on the processor, operative for presenting at least one result of at least one proof-of-concept test to each client which has pre-registered.

PCAP is an example of a packet sniffing API, described e.g. at en.wikipedia.org/wiki/Pcap and at www.tech-faq.com/pcap.html. Many applications are known for opening and/or reading .pcap files such as but not limited to Wireshark, WinDump, tcpdump, snort, Packet Square—Capedit and Ethereal.

The disclosures of all publications and patent documents mentioned above in particular, and in the specification in general, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments seek to enhance or complete a PoC environment by providing mimicked network traffic originating from real traffic recorded in a production environment. An enterprise running a PoC may record this real traffic and may upload it, e.g. in PCAP file form, e.g. to a PoC platform. Typically, the traffic is recorded e.g. as above, and then, after suitable adaptation or modification e.g. as described herein, replayed in a PoC (aka PoC) environment which may be provided for each PoC by a PoC platform. Typically, replaying includes reading network packets from a file (e.g. a PCAP file which may have been modified or adapted as described herein) and sending these packets over a net e.g. a local network within a PoC environment.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

The present invention typically includes at least the following embodiments:

Embodiment 1

A method for running proof-of-concepts for software solutions, the method including: receiving, from an enterprise, an indication of network locations of servers in a production environment for a software solution selected from among plural candidates software solutions participating in a proof-of-concept running in a PoC environment on a proof-of-concept (aka PoC) platform; providing at least one recording, uploaded onto the platform, of traffic between the servers in the production environment; providing a mapping of the network locations to, respectively, PoC platform local network addresses of servers within the PoC environment; adapting the recording by replacing each occurrence of an individual one of the network locations, within the recording, with a PoC environment server local network PoC platform address to which the individual one was mapped, thereby to generate at least one adapted file; and replaying the at least one adapted file on the servers within the PoC environment.

It is appreciated that if, say, a recording is performed on enterprise server 1 and the counterpart of enterprise server 1 is PoC platform server 1, the adapted recording may be replayed on PoC platform server 1.

Embodiment 2

A method according to any of the preceding embodiments wherein the recording comprises at least one PCAP file.

Embodiment 3

A method according to any of the preceding embodiments wherein the production environment's server includes software configured to record network traffic which may include incoming and/or outgoing traffic, for a PoC Environmental Perimeter.

Embodiment 4

A method according to any of the preceding embodiments wherein the enterprise sets up an PoC environment via its account in a proof-of-concept platform.

Embodiment 5

A method according to any of the preceding embodiments wherein the Enterprise performs mapping of PoC Perimeter to PoC servers.

Embodiment 6

A method according to any of the preceding embodiments wherein the enterprise uploads recorded traffic together with PoC environmental mapping to the enterprise's environment in the proof-of-concept platform.

Embodiment 7

A method according to any of the preceding embodiments wherein servers are deployed on every machine in the PoC environment that responds to incoming requests in a required network protocol, thereby to provide a correct replay of recorded traffic.

Embodiment 8

A system for running proof-of-concepts for software solutions (aka software to be evaluated), the system including:
at least one file storing network traffic recorded in a production environment,
and a controller running software to be evaluated in a PoC environment on a PoC platform, including replaying, in the PoC environment, "mimicked" traffic generated from network traffic recorded in the at least one file.

Embodiment 9

A system according to any of the preceding embodiments wherein an enterprise end user defines network locations of servers in the production environment via a predefined user interface and wherein the traffic generated from network traffic recorded in the at least one file is generated by replacing, aka substituting, each occurrence of an individual one of the network locations, within the network traffic as recorded, with a PoC environment server address to which the individual one was mapped.

Embodiment 10

A system according to any of the preceding embodiments wherein a PoC platform's server generates the mimicked traffic and wherein the file storing network traffic is uploaded by an enterprise end-user of the PoC platform.

Embodiment 11

A method according to any of the preceding embodiments wherein the recording is generated by a network traffic capture application programming interface.

The following terms may be construed either in accordance with any definition thereof appearing in the prior art literature or in accordance with the specification, or to include in their respective scopes, the following:

Selected Solution: intended to include a solution (e.g. software product which may be associated with an independent software vendor end-user of a PoC platform such as the proov.io PoC platform (aka "Proov") that successfully passes a PoC (which may have been run on a PoC platform such as the proov.io PoC platform) and was chosen by the enterprise (e.g. an enterprise end-user on a PoC platform, such as the proov.io PoC platform, for production.

PoC: proof-of-concept proof-of-concept platform: intended to include any platform for performing PoC's, typically in collaboration between at least one enterprise end-user of the platform, and at least one ISV (or vendor or startup) end-user of the platform. One example of a proof-of-concept platform or system is the proov.io PoC platform, or any system constructed and operative as described in the proov.io website or any system described in any of the co-pending patent applications shown and described herein.

PoC platform environment: intended to include servers used by a PoC platform.

development environment: intended to include an individual developer's workstation, production environment: intended to include a network of plural virtual machines in cloud computing and/or of geographically distributed machines in data centers—a facility which may use as much electricity as a small town, which houses computer systems and associated telecommunications and storage systems. Typically includes redundant or backup power supplies, and/or redundant data communications connections, and/or environmental controls (e.g. air conditioning, fire suppression) and/or security devices.

PoC Environmental Perimeter: data regarding (e.g. network addresses of) a first set S of servers (e.g. in an enterprise end user's production environment) that will host and/or perform the selected solution. The perimeter may also include data regarding (e.g. network addresses of) a second set of servers on which the solution is not deployed, however this second set of servers interact/s with the server/s in the first set (e.g. in data communication therewith, providing inputs to the selected solution or receiving outputs therefrom). Example: the selected solution installation requires two Linux servers A, B (on which the solution is to be installed). However, the selected solution also works with the enterprise's DB server C, and with an LDAP server D for user management. In that case, the PoC Enviromental Perimeter is ABCD, where A, B are the host servers on which the solution is deployed (first set S) and C, D are affected servers i.e. servers C, D interact with server A and/or server B.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or a combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in the singular form is not intended to be limiting; thus the term processor is intended to include a plurality of processing units which may be distributed or remote, the term server is intended to include plural, typically interconnected modules, running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings; all flowchart illustrations are for methods which may comprise any subset of or all of the illustrated operations, suitably ordered e.g. as shown:

FIGS. 1, 2 are simplified flowcharts illustrating processes provided in accordance with certain embodiments of the present invention.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

All of any subset of the following operations 1-3, shown in FIG. 1, may be performed by an enterprise typically on its own (digital) premises, in any suitable order e.g. as shown, typically before a PoC initiated by the enterprise, as an end-user of a PoC platform, has actually started:
1. Perimeter definition
2. generating (PCAP file e.g.) recordings on the servers in perimeter
3. Uploading the recorded (e.g. PCAP) file to the PoC platform All of any subset of the following operations 101-104, shown in FIG. 2, may be performed on a PoC platform, in any suitable order e.g. as shown. Operations 101, 102, 103 are typically performed before each PoC has begun. Operations 101, 102 may be performed by an enterprise end-user of the platform which defines a particular PoC.
101. Setup PoC environment which may or may not mimic or resemble the perimeter as defined above.
102. Setup mapping of servers from Perimeter to PoC environment.
103. Processor in PoC platform adapts uploaded PCAP recordings by substituting network (e.g. enterprise's LAN and/or WAN) addresses of servers in PoC environment for network addresses (e.g. PoC platform local network addresses) of production environment servers, in accordance with the mapping set up in operation 102 above. This typically yields PCAP files where original IP addresses (e.g. of production environment servers) are replaced by IP addresses from the PoC environment. Substitution is achieved via the above mentioned mapping.
104. During the PoC, an ISV end-user of the platform installs and runs its software on PoC servers in the PoC environment. Adapted PCAP files may then be replayed on these servers.

All or any subset of operations 900-1430 below, in any suitable order e.g. as shown, may be performed e.g. to implement operations of FIGS. 1 and/or 2.

900: (typically performed by an enterprise on its own premises, before the relevant PoC has actually started)

Enterprise e's IT personnel, contemplating a PoC x, sets up a production environment for the solution that will be selected after completion of PoC x and configures the production environment to record traffic. The term "traffic" as used herein typically does not refer to Internet traffic in a browser. Typically, all servers in an enterprise have a predefined configuration with pre-installed software such as but not limited to all or any subset of: backup, malware detection, product inventory agents; this generates traffic. Alternatively or in addition, these servers are typically connected to an enterprise network that also is not "silent" since servers interact with other network elements in this network. 1000. (typically performed by an enterprise end-user, on a PoC platform, before the PoC has begun) Enterprise e's IT personnel opens a new PoC, PoC x, in the PoC platform including defining to the PoC platform e.g. Proov, a PoC environment for PoC x. The PoC platform builds virtual servers for PoC x accordingly. The PoC environment may or may not mimic the perimeter defined in operation 1300.

The enterprise IT personnel may use the PoC platform's PoC environment definition user interface to create a counterpart virtual server, for each server in the perimeter. There may be a behavior mirroring enabling option for each server, such that servers that are counterparts of (are mapped to) the first set of servers may be behavior mirroring-enabled and, responsively, the environment of the relevant PoC is operative to play the modified PCAP recording on these servers.
1300: (typically performed by an enterprise end-user, on a PoC platform, before the PoC has begun) enterprise e's IT personnel characterizes to the PoC platform e.g. Proov, the production environment (aka intended production) that he has prepared for the solution that will be selected after completion of PoC x. Typically, the characterization includes an indication of the production's perimeter.
1340: (typically performed by an enterprise end-user, on a PoC platform, before the PoC has begun) enterprise e's IT personnel maps each server (say: servers a, b, c and d) in the production's perimeter, to (or from) one of the virtual servers (say: servers w1, w2, db1) built for PoC x's environment (aka platform environment for PoC x). The PoC platform may have a computerized menu to fill in, to facilitate this operation.
1350: (typically performed by an enterprise end-user, on a PoC platform, before the PoC has begun) enterprise e's IT personnel uploads, to the PoC platform, typically via a secure pipeline between enterprise e and the platform which the platform has defined for PoC x, the traffic recorded by the production environment in operation 900. The recorded traffic may for example comprise PCAP file/s which are then uploaded to the PoC platform. Typically, a separate recording is made for at least each server on which the selected software will reside (or each recording in first set S as described herein).
1370: (typically performed by an enterprise end-user, on a PoC platform, before the PoC has begun) PoC platform generates mimicked production traffic by adapting uploaded recorded traffic including replacing each reference, in any recorded packet, to a server SP in the production's perimeter, with a reference to a virtual server built for PoC x's platform environment, which is mapped to server SP, thereby to render the uploaded PCAP recordings (say) applicative to servers in the PoC environment. Typically, the mimicked production traffic includes PCAP files which are similar to the uploaded PCAP files except that the IP addresses in the uploaded files are substituted with the IPs of PoC environment server, where the substitution occurs in accordance with the mapping set up in operation 1340.
1410: each of the n participating ISV's installs its software solution on PoC servers. PoC x is run on the PoC-platform environment defined in operation 1000. During PoC x, each ISV runs its software solution on the virtual servers defined for PoC x, as the mimicked production traffic e.g. adapted PCAP files generated in operation 1370, is/are replayed, for each of the n solutions participating in PoC x.

For example, perhaps the production environment includes 2 servers, enterprise servers 1 and 2, on which the selected software solution will reside. Recordings are performed on enterprise servers 1 and 2, yielding PCAP files 1 and 2 respectively. The counterpart PoC environment servers to which enterprise servers 1 and 2 are mapped are PoC servers 1 and 2 respectively. Then, the adapted recording generated from PCAP file 1 in operation 1370 may be replayed on PoC server 1. The adapted recording generated from PCAP file 2 in operation 1370 may be replayed on PoC server 2.

1420: (typically performed by an enterprise end-user, on a PoC platform, during or after the PoC) viewing results of the PoC x on the PoC platform, including KPIs generated by the platform for each of the independent software vendor (ISV) end users e.g. independent software vendor end users during PoC x, enterprise e's CTO selects a solution s from among the n solutions presented by the n independent software vendor end users participating in PoC x; thus s is selected based on a PoC conducted by comparing how well (based on suitable KPIs) various independent software vendor end user solutions perform, when they encounter traffic similar to the real traffic that the selected solution is going to encounter in the production environment contemplated by enterprise e for solution s.

1430 (typically performed by an enterprise end-user, on a PoC platform, after the PoC) solution s is installed by enterprise e's IT personnel, on the production environment set up in operation 900.

Processes I, ii described below, include operations 2100 onward which may for example be used to implement (or replace) any or all operations 1-1420 described above. All or any subset of operations 2100 onward may be performed in any suitable order e.g. as shown.

Process I

In a PoC aka proof of concept system or platform, the PoC environment provided for a given PoC being conducted for a given enterprise end-user of the platform, process I simulates the actual production environment, i.e. the environment that the enterprise intends, in future, to use to host the selected solution, once one or another of the independent software vendor end-users participating in the PoC with its respective solution, successfully passes the PoC (the solution entered by the independent software vendor end-user that passed the PoC successfully, is termed herein the "selected" solution). In practice, the selected solution will face the reality of the enterprise's production environment only once the selected solution is in production.

Process I may be carried out once per proof-of-concept taking place in a proof-of-concept platform or system such as the Proov PoC platform (or any system constructed and operative as described in the proov.io website or any system described in any of the above-referenced co-pending patent applications). Process I may include all or any subset of the following operations, suitably ordered e.g. as follows:

2100. Enterprise (e.g. PoC platform enterprise end-user) may define the PoC Environmental Perimeter.

The system herein may provide UI (user interface) to facilitate operation 1 (inter alia), wherein the user interface typically is configured to allow a human end-user to type in the hostnames/IPs of servers in the PoC's perimeter (or servers hosting the selected solution). The enterprise's production environment's main server may generate a command (which may be different depending on whether the enterprise's production environment's main server's operating system is, say, Linux or Windows. The enterprise's production environment's server's operating system may execute this command to record traffic e.g. packets travelling between each of the servers defined as belonging to the PoC perimeter.

Typically, each enterprise records network traffic on servers from the first set of servers in the perimeter only and not from the second set of servers, using any suitable convention network traffic recording tools available on operating systems like Windows and Linux e.g. as described below. Since, due to the differences in operating systems like Windows and Linux, different sets of commands may be used by enterprise end-users to record traffic, the PoC platform's UI, and associated logic which may be implemented on any suitable processor, according to certain embodiments, helps to generate these commands for these operating systems.

The enterprise user may then use these commands on servers from the first set in enterprise environment on-premises, to record traffic into PCAP files.

Example: PoC platform's UI prompts the Enterprise end-user (the enterprise's IT engineer, typically) to key in the IP address (such as, say, 10.0.3.1) of servers in the enterprise's perimeter, and to identify the enterprise's operating system. Accordingly, the PoC platform's server logic generates commands to run (e.g. commands to be used on servers in the Enterprise production environment on-prem to record traffic) such as, say, the following command: tcpdump -nvvv -i any -c 3 host 10.0.3.1.

2200. The enterprise's production environment's main server may include software configured to record (e.g. from the enterprise's production environment's main server's network interface card aka NIC, or Network card) network traffic, e.g. packets which pass over the network, for (e.g. travelling between servers included in) PoC Environmental Perimeter. If the enterprise's server/s are Linux machines, the recording may be performed by the built-in tcpdump tool. If the enterprise's server/s are Windows machines, the recording may be performed by built-in Microsoft Window NDIS PacketCapture Provider. The recorded traffic may for example be saved in one or more files. If the perimeter includes 4 servers abcd, the recorded network traffic may, according to certain embodiments, include traffic, in both directions (both incoming and outgoing), between each pair of servers e.g. between server a and each of servers b, c, d; between b and each of servers c, d; and between servers c and d. Or, the recorded network traffic may according to certain embodiments, include traffic, in both directions (both incoming and outgoing), only between each pair of servers in the perimeter's first server set S. The network includes the communications infrastructure e.g. LAN which interconnects the enterprise servers.

2300. a PoC platform environment (aka PoC environment) is set up for each enterprise's PoC, responsive to a request to open a new PoC, that the enterprise provides typically via its account in a PoC platform.

2400. Enterprise may perform "PoC platform environmental mapping" e.g. mapping of PoC Perimeter to PoC servers.

Example: during the setup of PoC platform environment (in operation 3 above), the enterprise launched two Windows server W1, W2, one DB server DB1; the user management performed from W2 as well. So, the mapping is A→W1, B→W2, C→DB1, D→W2 where A,B,C,D may each be the IP addresses of enterprise servers 1, 2, 3, 4 . . . (on which network traffic is recorded) and w1, etc. may be the IP address of PoC platform's server 1 which is dedicated to this enterprise's current PoC, DB1 etc. where the traffic once modified or adapted is played (aka replayed) on the PoC platform's server/s.

2500. Enterprise (e.g. human end-user of a PoC platform who represents the enterprise) may upload file/s storing recorded traffic from operation 2 altogether with PoC environmental mapping from operation 4 to its PoC platform environment.

It is appreciated that traffic may contain sensitive and/or encrypted data. The enterprise may anonymize or otherwise protect this data after recording it, and it is appreciated that the enterprise does not need to upload the encryption key, even if the recorded data is encrypted.

The PoC platform's main server may provide an interface (UI) for uploading the recorded traffic. Upon uploading the PoC platform e.g. Proov, or any system described in any of the above-referenced co-pending patent applications, may launch an interface (UI) to define PoC environmental mapping. The system or platform of the present invention may use this mapping to adapt the recording to PoC platform environment for replay.

2600. The PoC platform's main server may generate the mimicked traffic recording from uploaded data in operation 5 using tcprewrite tool. e.g using process ii, below. It is appreciated that this allows the network capacity in the real production environment (which may, say, be 10 Gigabyte/sec) to be approximated.

2700. The PoC platform's main server may replay the mimicked traffic recording (e.g. with substituted servers) in PoC platform environment e.g. using linux's tcpreplay network traffic replaying tool. It is possible to replay the mimicked traffic recording once or as-is; or to replay in a loop.

Process ii

Process ii is operative for generation of Mimicked traffic, e.g. to implement operation 2600 described above. Typically, the mimicked traffic generation process aka process ii may include the following two phases or operations:

3100. Rewrite or reconstruct the IPs/hostnames in original traffic recording based on PoC environmental mapping. Example: it appears in original recording that A sent requests to D; that may result that in mimicked recording W1 may send request to W2 (see above example)

3200. In case a Void network node is present in a given recording, the mimicked traffic may contain packets sent from a (dedicated) PoC platform server. A Void network node is a server that appears in a recording uploaded by an enterprise end-user, but was not mapped to any virtual server in the platform's PoC environment e.g. because this server was, probably erroneously, never defined or identified as part of the PoC Environmental Perimeter.

For example, network traffic (both incoming and outgoing) may be recorded, before and/or during PoC execution, for a perimeter that consists of two servers. These two servers exchange data between them, but may also send/receive the data to servers not in the perimeter. These servers not in the perimeter may appear in the original recording, so during adaption of the recorded files, IP addresses of servers that are not in perimeter may be substituted with IP addresses of some specific server e.g. in the PoC environment generated by the platform, using suitable open source software which can perform such substitutions, such as tcpdump, tcprewrite, tcpreplay, etc.

It is possible to generate additional mimicked traffic using Deep Mirroring, a Proov data population option.

Generally, it is appreciated that for mapping purposes, the enterprise end-user (e.g. enterprise's IT engineer, who typically does not know the IP addresses of PoC environment servers to be generated by the PoC platform) may be prompted by the PoC platform's UI (user interface) to key in the IPs of his enterprise's servers all in association with the specific PCAP file in which production environment traffic has been recorded and which is typically uploaded via the UI. Then, the enterprise end-user may associate this PCAP address with one of the PoC platform's servers. The PoC platform which does know the IP addresses of PoC environment servers generated by the PoC platform then eventually uses the information keyed in by the enterprise end-user to adapt the uploaded traffic files. For example, as part of the enterprise defining the PoC environment, the enterprise would like to get from the PoC platform, the enterprise may define, e.g. as prompted by the platform's PoC-defining UI, all servers that the enterprise has in this PoC's production environment (the very environment in which network traffic has been recorded), typically including the IP addresses thereof. Also, the enterprise may indicate whether one virtual PoC environment server, or less, or more, is desired per each production environment server. Then, accordingly, the PoC platform provides servers, each having a local PoC platform network address, for this PoC, as part of the PoC environment for this PoC. This then allows the PoC platform to adapt the traffic files uploaded by the enterprise, e.g. by replacing or substituting each (known from the user interface) enterprise production environment local network address of a server s appearing in the recorded traffic files, with a (known by the platform itself) PoC environment local network address of a PoC environment server s' which is "mapped to" server s.

It is appreciated that according to certain embodiments, PCAP files are played during a PoC thereby to allow the PoC to more closely mimic the enterprise's anticipated production environment.

Each software solution, e.g. as provided by a given ISV, runs on certain data. For example, if a given software solution is OCR software, its input data may be pdf documents from db1, and output data may be alphanumeric texts going into db2. The recorded traffic described herein may include packets storing the above input data to the software solution going from db1 to server, and packets storing the above output data from the software solution going from server to db2 and/or may also include packets passing through this machine or server which are neither input data nor output data.

A Void network node is a server that appears in a recording uploaded by an enterprise end-user, but was not mapped to any virtual server in the platform's PoC environment e.g. because this server was, probably erroneously, never defined or identified as part of the PoC Environmental Perimeter. If, during PoC, recorded traffic is being played and is found to include a strange server IP address, hence is deemed void, then typically, those recorded packets that are originated in, or sent to, servers that are not in the perimeter, are disregarded, and are not played.

The term "perimeter" as used herein comprises, or consists of, a list or set of IP addresses or other unique network identifiers of each server in the enterprise's anticipated or contemplated production environment. According to certain embodiments, via the PoC platform's PoC-defining user interface, an engineer, representing an enterprise end-user, defines this perimeter. According to certain embodiments, a PoC platform processor then generates a traffic-recording command for that perimeter, which is executed by an enterprise operating system. It is appreciated that the perimeter described herein is but one possible format or formal description of the production environment.

Many variations are possible. For example, any suitable application programming interface (API) such as but not limited to pcap may be used for capturing network traffic. it is appreciated that any suitable data files, such as but not limited to pcap files, may be created to contain packet data of a network. Conventional monitoring software which uses either libpcap, WinPcap, or Npcap to capture network packets travelling over a computer network is known. Conventional monitoring software which transmits packets on a network at the link layer, and yields a list of network interfaces which may then be used, say, with libpcap, WinPcap, or Npcap, is also known.

By way of example, assume 5 (or more generally n) startups or ISVs (aka vendors) are participating in a certain PoC x. Typically, each of the 5 uploads code for their own software solution, over their individual secure pipeline from the startup/ISV server to the server that the PoC platform has built for PoC x. It is appreciated that those 5 pieces of code may all be uploaded into one virtual server e.g. all 5 of these ISV/startups may interact with one PoC environment (virtual) server. Or, the PoC platform may generate 5 identical virtual servers, and on all 5 of them, the same modified PCAP recording may be played, in which case, the mapping is from one production server into 5 different PoC servers. For example, ISV1 may interact with the PoC platform's server1, . . . ISV5 may interact with the PoC platform's servers. The platform may allow each enterprise end-user to decide whether to provide plural startups participating in a single PoC with a single shared environment, with all 5 ISVs (each typically under a different system user) running their respective software solutions on a single virtual server, or whether to provide each of these plural startups with its own dedicated virtual server. More generally, it is not necessarily the case that exactly one virtual server is defined in the PoC environment on the platform, for each server in the enterprise's production environment.

Any process, operation, feature or embodiment described herein may be provided in conjunction with any embodiment of PoC platform and technologies described in the published co-owned patent documents mentioned herein (hereby incorporated by reference).

A particular advantage of embodiments herein is that a "selected solution" cannot successfully pass the PoC (cannot be selected over other ISV software solutions in a PoC) and then be unable to function when installed on-premises i.e. in the production environment of the enterprise which ran the PoC) e.g. because the product's network requirements are, it turns out, not satisfied by the enterprise's production environment. It is appreciated that there is no known direct way to entirely solve this problem e.g. by a priori defining a software product's network requirements in a manner which truly defines in advance, reliably and validly, the network requirements of a given product and truly indicates, in advance, what the software product's network consumption is going to be. This concern, and the network traffic recording-adapting-and-replaying method described herein, has implications for many software engineering situations, even beyond the specific PoC platform use-case herein.

It is appreciated that data described herein as being provided (say by an enterprise having a production environment) to a computerized system e.g. PoC platform running a PoC for software intended to run in future in that production environment) via a user interface, may alternatively be provided automatically e.g. via a suitable API or APIs.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein, may be deployed in a cloud environment. Clients e.g. mobile communication devices, such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A method for running proof-of-concepts for software solutions, the method including:
    receiving, from an enterprise, an indication of network locations of servers in a production environment for a software solution selected from among plural candidates software solutions participating in a proof-of-concept running in a PoC environment on a proof-of-concept (aka PoC) platform;
    providing at least one recording, uploaded onto said platform, of traffic between said servers in said production environment;
    providing a mapping of said network locations to, respectively, PoC platform local network addresses of servers within said PoC environment;
    adapting said recording by replacing each occurrence of an individual one of said network locations, within said recording, with a PoC environment server local network PoC platform address to which said individual one was mapped, thereby to generate at least one adapted file; and
    replaying said at least one adapted file on said servers within said PoC environment
    wherein the enterprise uploads recorded traffic together with PoC environmental mapping to the enterprise's environment in the proof-of-concept platform.

2. A method according to claim 1 wherein said recording comprises at least one PCAP file.

3. A method according to claim 1 wherein the production environment's server includes software configured to record network traffic which may include incoming and/or outgoing traffic, for a PoC Environmental Perimeter.

4. A method according to claim 1 wherein the enterprise sets up an PoC environment via its account in a proof-of-concept platform.

5. A method according to claim 1 wherein the Enterprise performs mapping of PoC Perimeter to PoC servers.

6. A method according to claim 1 wherein servers are deployed on every machine in the PoC environment that responds to incoming requests in a required network protocol, thereby to provide a correct replay of recorded traffic.

7. A method according to claim 1 wherein said recording is generated by a network traffic capture application programming interface.

8. A method according to claim 1 wherein mimicked traffic is generated using a data population process.

9. A system for running proof-of-concepts for software solutions (aka software to be evaluated), the system including:
    at least one hardware processor configured for:
    receiving, from an enterprise, an indication of network locations of servers in a production environment for a software solution selected from among plural candidates software solutions participating in a proof-ofconcept running in a PoC environment on a proof-of-concept (aka PoC) platform;

providing at least one recording, uploaded onto said platform, of traffic between said servers in said production environment;

providing a mapping of said network locations to, respectively, PoC platform local network addresses of servers within said PoC environment;

adapting said recording by replacing each occurrence of an individual one of said network locations, within said recording, with a PoC environment server local network PoC platform address to which said individual one was mapped, thereby to generate at least one adapted file; and replaying said at least one adapted file on said servers within said PoC environment wherein the enterprise uploads recorded traffic together with PoC environmental mapping to the enterprise's environment in the proof-of-concept platform.

10. A system according to claim 9 wherein an enterprise end user defines network locations of servers in the production environment via a predefined user interface and wherein said traffic generated from network traffic recorded in said at least one file is generated by replacing, aka substituting, each occurrence of an individual one of said network locations, within said network traffic as recorded, with a PoC environment server address to which said individual one was mapped.

11. A system according to claim 9 wherein said PoC platform includes a server which generates the mimicked traffic and wherein said file storing network traffic is uploaded by an enterprise end-user of the PoC platform.

12. A system according to claim 9 including a controller running software to be evaluated in the PoC environment on the PoC platform, including replaying, in said PoC environment, "mimicked" traffic generated from network traffic recorded in at least one file storing said network traffic recorded in said production environment.

13. A computer program product, comprising a non-transitory tangible computer readable medium having computer readable program code embodied therein, said computer readable program code adapted to be executed to implement a method for running proof-of-concepts for software solutions, the method including:

receiving, from an enterprise, an indication of network locations of servers in a production environment for a software solution selected from among plural candidates software solutions participating in a proof-of-concept running in a PoC environment on a proof-of-concept (aka PoC) platform;

providing at least one recording, uploaded onto said platform, of traffic between said servers in said production environment;

providing a mapping of said network locations to, respectively, PoC platform local network addresses of servers within said PoC environment;

adapting said recording by replacing each occurrence of an individual one of said network locations, within said recording, with a PoC environment server local network PoC platform address to which said individual one was mapped, thereby to generate at least one adapted file; and replaying said at least one adapted file on said servers within said PoC environment, wherein the enterprise uploads recorded traffic together with PoC environmental mapping to the enterprise's environment in the proof-of-concept platform.

* * * * *